(12) United States Patent
Kallander

(10) Patent No.: US 6,571,760 B2
(45) Date of Patent: Jun. 3, 2003

(54) INLET MANIFOLD WITH RUNNERS WITH VARIED RADII

(75) Inventor: Jonas Kallander, Frolunda (SE)

(73) Assignee: Volvo Car Corporation (SE)

( * ) Notice: Subject to any disclaimer, the term of this patent is extended or adjusted under 35 U.S.C. 154(b) by 0 days.

(21) Appl. No.: 10/214,541

(22) Filed: Aug. 8, 2002

(65) Prior Publication Data
US 2003/0029408 A1 Feb. 13, 2003

(30) Foreign Application Priority Data
Aug. 10, 2001 (EP) .............................. 01850139

(51) Int. Cl.⁷ ............................... F02M 35/104
(52) U.S. Cl. ..................... 123/184.47; 123/184.21; 123/184.53
(58) Field of Search ........ 123/184.21, 184.24–184.26, 123/184.34–184.36, 184.42–184.44, 184.47–184.49, 184.51, 184.53, 184.57

(56) References Cited
U.S. PATENT DOCUMENTS
4,513,699 A * 4/1985 Cser ...................... 123/184.57

FOREIGN PATENT DOCUMENTS

| DE | 19940617 | | 3/2000 | |
|---|---|---|---|---|
| DE | 19960223 | | 1/2001 | |
| EP | 0327848 | | 8/1989 | |
| EP | 0939211 | | 9/1999 | |
| GB | 339221 | | 12/1930 | |
| JP | 60-062656 | | 9/1983 | |
| JP | 62-010421 | * | 1/1987 | ............ 123/184.42 |
| JP | 3-160111 | * | 7/1991 | ............ 123/184.42 |
| JP | 2000-199460 | | 12/1998 | |

* cited by examiner

Primary Examiner—Tony M. Argenbright
(74) Attorney, Agent, or Firm—Diana D. Brehob (57) ABSTRACT

An air inlet manifold for a multi-cylinder internal combustion engine having a distribution chamber restricted by at least a first internal wall and a plurality of pipe channels each restricted by at least a second internal wall, which pipe inlet is described by a first surface with a first area restricted by a first line in the boundary between the pipe inlet and the first internal wall The pipe channel is described by a second surface with a second area restricted by a second line along the perimeter of the pipe channel, the second surface is generally perpendicular to the extension direction of the pipe channel. A profile between the first line and the second line in a pipe located proximate to the air inlet has a different curvature than a profile between the first line and the second line in a pipe located distant from the air inlet.

12 Claims, 7 Drawing Sheets

Fig. 7

INLET MANIFOLD WITH RUNNERS WITH VARIED RADII

TECHNICAL FIELD

The present invention refers to an air inlet manifold for an internal combustion engine, which air inlet manifold has pipes for distribution of air to cylinders of the engine.

BACKGROUND OF THE INVENTION

A combustion engine comprises combustion chambers, cylinders, a fuel supply, and an air inlet manifold to supply and distribute air to the combustion chambers of the engine. The air is supplied to the air inlet manifold via a throttle, which controls the amount of air. The manifold comprises at least one distribution chamber and a number of pipes mounted to the combustion chambers, normally one pipe per combustion chamber.

The features of the distribution chamber and the pipes are important for many reasons. When a driver increases or decreases pressure on the gas pedal, thereby demanding a change in throttle and airflow, it is desirable to have the engine respond as quickly as possible. One way to achieve this is to have a small volume in the air inlet manifold, since such a small volume gives a smaller air volume within the air inlet manifold, and the smaller air volume responds more quickly to changes of airflow/pressure dependent on the changes of the throttle. To get a small volume, it is desirable to place the pipes as close together as possible.

The features of the pipes are important for providing the best air supply to the combustion chambers. Between the combustion chambers and the pipes there are valves that open and close, typically, synchronized with the movement of the pistons in the combustion chambers. The valves are mounted in the cylinder head, which cylinder head is mounted to the pipe. Each valve opens with a movement away from the cylinder head, i.e., in the direction of the airflow, and closes with a movement in the opposite direction. When the valve opens, a pressure pulse propagates in the pipe into the distribution chamber of the air inlet manifold, where the pulse changes direction and returns back into the pipe. This phenomena is well known, and it is desirable to design the pipes in such a way that when the engine rotates with a predetermined rotation per minute, rpm, the pulse returns to the valve when the valve opens, thereby pushing en extra amount of air into the combustion chamber. When designing a combustion engine, this phenomenon is normally designed to occur when the torque curve is reaching its maximum, giving an extra amount of air into the cylinder. In fact, the design of the pipes normally decides the torque maximum.

A typical air inlet manifold extends in a longitudinal direction from a first end to a second end, and the air inlet manifold has an air inlet at the first end, a distribution chamber for air extending in the longitudinal direction restricted by at least a first internal wall, and an end wall at the second end. At least one air pipe for each cylinder is distributed along the longitudinal direction and protrudes essentially perpendicular to the first wall. The pipes each have an pipe inlet, a pipe channel restricted by at least a second internal wall, and a pipe outlet. The upper part of the pipes, the part of the pipe closest to the distribution chamber, extends essentially perpendicular to the first internal wall of the distribution chamber, with the pipe inlet towards the distribution chamber. The pipe inlet of each pipe has a phased edge that is rounded by a convex radius from the second internal wall to first internal wall, which edge is uniform around the pipe inlet.

In view of the above, it is important that the volume in the distribution chamber is small enough to give good engine response, and the features of the pipes are important to gain a good pressure pulse charging. One important feature for gaining good pressure pulse charging is that the edges in the pipes are phased with a small convex radius. However, when the engine is running at high engine speed, the airflow is high. If the edges are phased with too small a radius, undesirable turbulent phenomena can occur which limits the air flow in the pipe channels. Thus, to supply maximum air to the combustion chambers at high engine speeds, it is important that the edges have a radius large enough to avoid turbulent phenomena around the pipe inlet. Thus, there is a problem in designing the air inlet manifold since the design of the edge at the pipe inlet has to be a trade off between good pressure pulse charging and avoiding turbulent phenomena to supply enough air to the combustion chambers at high engine speed.

Pipes with different geometric features are known, for example, circular cross-sections, oval cross-sections, rectangular cross-sections, and D-shaped pipes. However, the trade off problem mentioned above applies to all.

In a multi-cylinder engine, it is desirable to have similar conditions in each combustion chamber. This implies that the air for the different combustion chambers shall be as similar as possible, i.e., the air inlet manifold must distribute the air equally over the pipes. This in turn implies that each pipe in the air inlet manifold have similar properties regarding the shape of the pipe inlet, pipe channel, and a pipe outlet. In the case where the pipes are mounted to the distribution chamber in a row, the shape of the pipe farthest from the air inlet of the air inlet manifold differs from the other pipes.

The second internal wall of the last pipe differs from the corresponding parts in the other pipes in that the second internal wall of the last pipe transitions into the end wall of the distribution chamber, i.e., the second internal wall of the last pipe does not have a phased edge on this part, but the second internal wall continues in a straight line and then follows the curvature of the end wall. Thus, the last pipe does not have the same geometry around the pipe inlet as the other pipes, thereby supplying air to the corresponding combustion chamber differently than the other pipes supplying air to their corresponding combustion chambers, thereby giving rise to different conditions for the different combustion chambers. As mentioned before, it is desirable to have as similar conditions as possible in the respective combustion chambers. The different features of the last pipe give rise to the problem of non-similar properties in the different combustion chambers. It is important to have similar properties regarding the air supply to the combustion chamber for good emissions.

SUMMARY OF THE INVENTION

The present invention aims to solve the above-mentioned problems by introducing a new shape of the edges of the pipe inlets in the air inlet manifold. The pipes can be fitted closer to each other, giving a smaller volume and thereby an engine with quick response. The invention also solves the problem of good pressure pulse charging. The invention also solves the problem with an air inlet manifold distributing the air equally over the pipes.

The identified problems are solved, according to the invention, by using an air inlet manifold for a multi-cylinder internal combustion engine. The air inlet manifold has a first end, an opposing second end with an end wall, and at least a first internal wall, if the body of the air inlet manifold has a circular cross-section. Alternatively, the air inlet manifold body has a rectangular cross-section, with several internal walls.

The air inlet manifold extends in a longitudinal direction from the first end to the second end. The air inlet manifold has an air inlet at the first end and at least one distribution chamber for air extending along the longitudinal direction and restricted by at least the first internal wall. The air inlet manifold also has at least one air pipe for each cylinder. The pipes are distributed along the longitudinal direction. The pipes each have an inlet towards the distribution chamber, and an opposing outlet, an upper part defined by a first length, L1 from the inlet to a first point. The upper part protrudes essentially perpendicular to the first internal wall.

Each pipe has a pipe channel between the inlet and the outlet, which is restricted by at least a second internal wall, i.e., if the pipe channel has a circular cross-section. Alternatively, the pipe channel has a rectangular cross-section with several internal walls. Further alternatives are a D-shape and an oval shape. The pipe outlet has an edge between the first internal wall and the second internal wall. The pipe inlet is described by a first surface with a first area restricted by a first line in the boundary between the first internal wall and the edge.

Each pipe channel, in a first cross-section, is described by a second surface with a second area restricted by a second line along the perimeter of the second internal wall. The first cross-section is taken in the first point perpendicular to the extension direction of the upper part of the pipe channel. The first and second area also comprise a first center point and a second center point, respectively, which center points represents the center of gravity of the area, e.g., the origin for a circle and the origin of an ellipse.

The invention is characterized in that for at least one of said pipes, a profile between the first line and the second line located proximate to the air inlet has different curvature than a profile between the first line and the second line located distant from the air inlet. The profiles may advantageously be in the form of curvatures and the first area is preferably greater than the second area. Preferably, the profile between the first line and the second line located proximate to the air inlet has a greater curvature than the profile between the first line and the second line located distant from the air inlet, and preferably the first area is greater than the second area.

According to the invention, the edges of each of the pipe inlets are phased with a surface described by a convex curvature, which convex curvature extends from the second internal wall to the first internal wall, with the convex part towards the pipe channel and distribution chamber. The convex curvature can be in the form of different radii, with different radii around the edge, preferably with the greater radii in the direction towards the air inlet. Here, radii mean convex curvatures with circular properties, i.e., one radius describes a part of a circle and the size of the radius (convex curvature) is dependent on the length of the radius. However, the convex curvature can according to the invention advantageously be in a parabolic shape or any other suitable shape.

Accordingly, if the edges are described by convex curvatures of different length and with the greater convex curvature in the direction towards the air inlet, then the pipe inlet, as seen from above, gets a different geometrical shape than the pipe channel. According to the invention, this gives rise to a pipe inlet and an upper part of the pipe channel with an edge phased with large convex curvatures towards the air inlet and small convex curvatures away from the air inlet. This difference in the phasing of the edge results in a preserved pulse loading (compared to prior art with small radii edges uniform around the pipe inlet), and also results in an enhanced air supply to the cylinders when the engine is running on high number of revolutions. The air supply is enhanced since the turbulence problem in the upper part of the pipe channel due to the "sharp" edges, mentioned in prior art, is reduced or even eliminated.

A part of or all of the upper part of the pipes may also be funnel-shaped, i.e., a part of the upper part of the pipe can be described as a cone-shape that transitions into the convex curvature of the edge.

According to one embodiment of the invention, the second area has a circular shape. But, as mentioned above, the second area can have a rectangular cross-section, a D-shape, or an oval shape, or any other shape suitable for the purpose.

In one embodiment of the invention, the first area has an elliptical shape with the two end points in a direction perpendicular to the longitudinal direction and with the first center point displaced along the longitudinal direction towards the air inlet, compared to the second center point.

In another embodiment of the invention, the first area has a rectangular shape with rounded corners, and with the first center point displaced along the longitudinal direction towards the air inlet compared to the second center point.

In yet another embodiment of the invention, the first area has a circular shape with the first center point displaced along the longitudinal direction towards the air inlet compared to the second center point.

In a further embodiment of the invention, the first area has a shape described by a first circular line, a second circular line, and a first and a second connecting curvature adapted to connect the first circular line with the second circular line. The first circular line is described by a first variable radius, $r_1$, greater than or equal to a second variable radius, $r_2$, describing the second circular line. The first and a second connecting curvature do not cross the second line in any point. The first and second radii have their starting point in the second center point, and which first variable radius describes the first circular line depending on a first angle, $\Phi_1$, and which second radius describes the second circular line dependent on a second angle, $\Phi_2$. The first and second angles relate to an imaginary centerline running through the second point in the longitudinal direction, and the length of the first and second radii varies dependent on the angles. The first angle is in the range between $0 \leq \Phi_1 \leq 20°$ and $340° \leq \Phi_1 \leq 360°$, and the second angle is in the range between $160 \leq \Phi_2 \leq 340°$. The first area is oriented in such way that when the first angle is 0°, the first radius points towards the air inlet. Preferably, the first radius may be constant during one segment within the range of the first angle, and the second radius may be constant during one segment within the range of the second angle.

Another way to describe the invention is to use the following wording in conjunction with the air inlet manifold described above. The pipe channel is defined by an interior periphery of said pipe, which pipe inlet is defined by a surface extending between said first internal wall and said interior periphery. The invention is then characterized in that for at least one of said pipes, a profile of said surface located proximate to the air inlet has a different curvature than a profile of said surface located distant from the air inlet.

In yet a further embodiment of the invention, the end wall is placed at a predetermined first distance from the closest pipe, which predetermined first distance is greater than 0.2 times the pipe channel diameter and less than the pipe channel diameter, preferably half the pipe channel diameter. If the pipe channel has a non-circular cross-section, said diameter may, for example, equal the hydraulic diameter $d_h$=4A/U, where A=cross-section area of the channel and U=the "wetted" perimeter of the channel.

BRIEF DESCRIPTION OF THE DRAWINGS

The invention will be described and explained below with reference to the figures shown in the attached drawings, in which.

DETAILED DESCRIPTION

The invention will, in the subsequent text, be described by a number of embodiments with references to the enclosed figures. The embodiments shall not be seen as limiting for the invention, but merely as examples to facilitate the understanding of the invention. The reference numbers will be three figure numbers with the first figure denoting which figure is concerned, and the following two figures denote a specific item depicted in the figures, which item can be the same for all pictures or the same item in different embodiments, i.e., 101 and 201 refers to two items in FIGS. 1 and 2 with either the same properties or different properties due to two different embodiments. The Figures do show some reference numbers that are not explicitly mentioned in the text, but this is, in view of the above-mentioned denotation, an aid in the understanding, enabling a reader to follow an item in different views and different embodiments in the figures.

Figure 1:
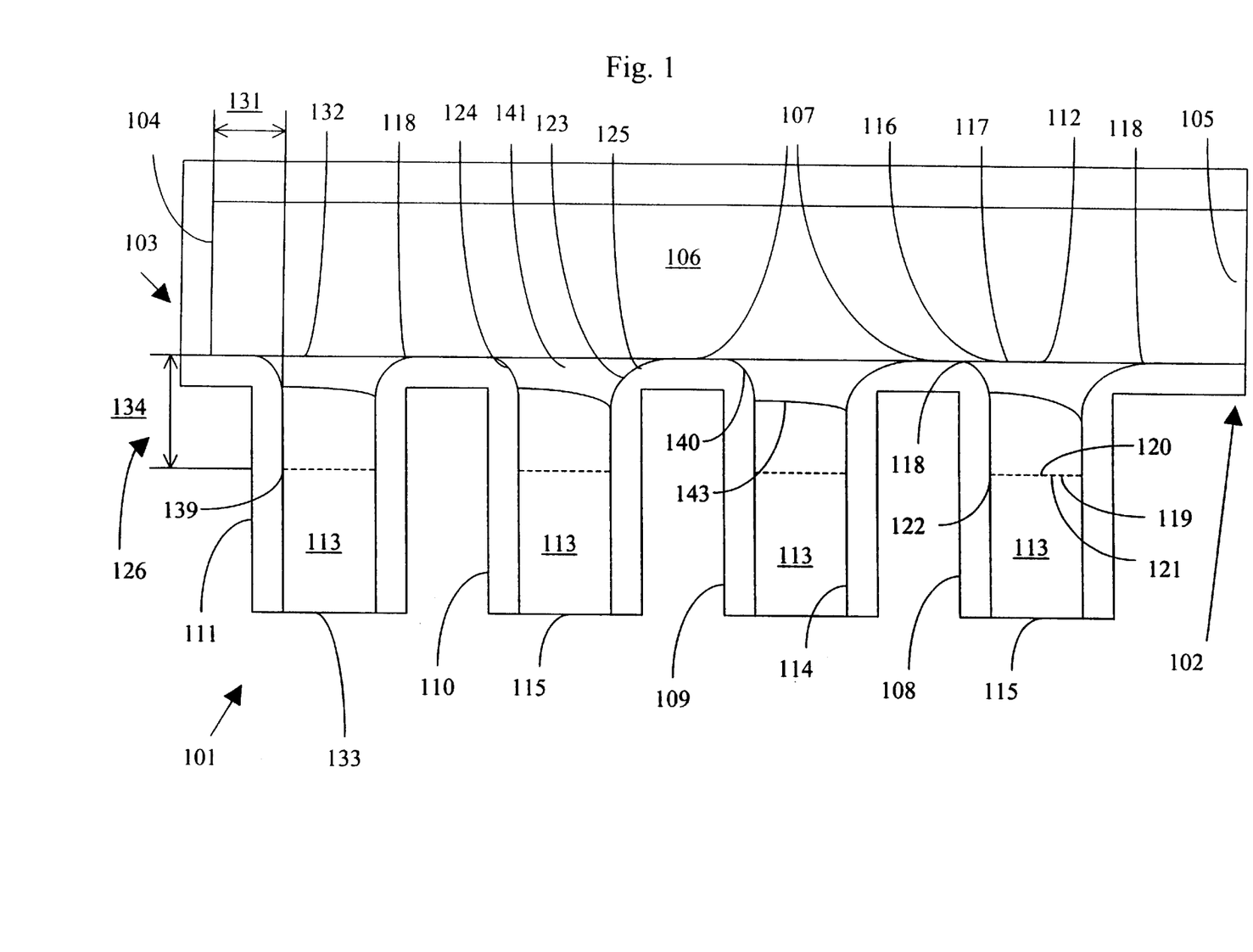
FIG. 1 diagrammatically shows an air inlet manifold according to the invention.
Figure 2:
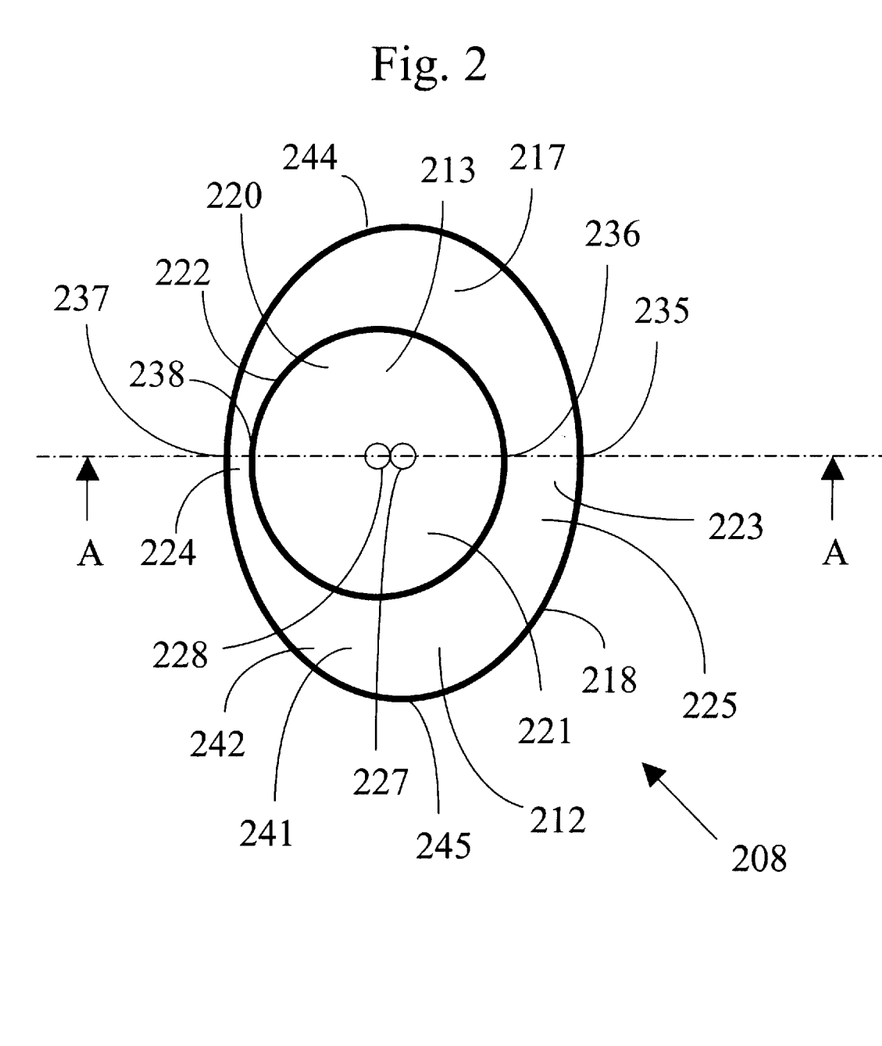
FIG. 2 diagrammatically shows one pipe of the air inlet manifold in FIG. 1 as seen from above, according to a first embodiment.

FIGS. 1 and 2 diagrammatically show the invention according to a first embodiment, where the invention uses an air inlet manifold 101 for an internal combustion engine with a number of cylinders, which air inlet manifold 101 has a first end 102, an opposing second end 103, with an end wall 104, and at least a first internal wall 107, i.e., if the body of the air inlet manifold 101 has a circular cross-section, there will be only one internal wall, except for the end wall. But, the air inlet manifold 101 may, of course, have a rectangular cross-section with several internal walls. In FIG. 1, the air inlet manifold 101 is depicted with a rectangular cross-section with several internal walls, but only the first internal wall 107 is denoted.

The air inlet manifold 101 extends in a longitudinal direction from the first end 102 to the second end 103, and comprises an air inlet 105 at the first end 102 and a distribution chamber 106 for air extending along the longitudinal direction restricted by at least the first internal wall. The air inlet manifold 101 also comprises air pipes 108, 109, 110, 111 for each cylinder, which pipes are distributed along the longitudinal direction. In the described embodiment, the air inlet manifold comprises a first-, second-, third-, and a fourth pipe 108, 109, 110, 111, with the first pipe 108 closest to the air inlet 105 and the fourth pipe 111 closest to the end wall 104.

The pipes 108, 109, 110, 111, each have a third end 132 towards the distribution chamber and an opposing fourth end 133, and each pipe comprises a pipe inlet 112 at the third end 132 and a pipe channel 113 between the third end 132 and the fourth end 133. The pipe channel is restricted by at least a second internal wall 114, i.e., if the pipe channel 113 has a circular cross-section, there will be only one internal wall, except for the end wall, which is shown in FIGS. 1 and 2. But, the pipes 108, 109, 110, 111 may, of course, have a different shape with one or several internal walls, e.g., a D-shape, or an oval shape, or a rectangular cross-section with several internal walls. The pipes 108, 109, 110, 111 also comprise a pipe outlet 115 at the fourth end 133, which pipes 108, 109, 110, 111 each also comprise an edge 125 between the first internal wall 107 and the second internal wall 114.

The pipe inlet 112 is described by a first surface 116 with a first area 117 restricted by a first line 118 in the boundary between the first internal wall 107 and the edge 125. The pipes each have an upper part 126 defined by a first length, L1, 134 from the first surface 116 along the pipe to a fifth point 139, with upper part 126 protruding essentially perpendicular to the first internal wall. The pipe channel 113 in a first cross-section 119 is described by a second surface 120 with a second area 121 restricted by a second line 122 along the perimeter of the second internal wall 114. The first cross-section 119 is taken in the fifth point 139, perpendicular to the extension direction of the upper part 126 of the pipe channel 113.

The first and second area 121 comprises a first center point 227 and a second center point 228, respectively. The center points 227, 228 represent the point of gravity of the area, e.g., the origin for a circle and the origin of an ellipse.

The pipe inlet 112 refers to each part of the air inlet manifold where the distribution chamber 106 transitions into the edge 125, and where the edge 125 refers to a rim 140 defined by the transition area between the distribution chamber 106 and the pipe channel 113.

The invention is characterized in that the upper part 126 of each pipe 108, 109, 110, 111 is shaped in such way that that the first line 118 has a different curvature than the second line 122 and that the first area 117 is greater than the second area 121.

According to the invention, the edges 125 of each of the pipe inlets 112 are phased with a surface 141 described by convex curvatures 123, 124 (or profiles described by convex curvatures), which convex curvatures 123, 124 extends from the second internal wall 114 to the first internal wall, with the convex part towards the pipe channel 113 and distribution chamber 106. In FIG. 2, the surface 241 is depicted by a third area 242 which is two-dimensionally depicted by the difference between the projected first and second areas 217, 221. The convex curvatures 123, 124 can be in the form of different radii, with different radii around the edge 125, preferably with the greater radii in the direction towards the air inlet. Here, radii mean convex curvatures with circular properties, i.e., one radius describes a part of a circle and the size of the radius (convex curvature) is dependent on the length of the radius. However, the convex curvatures 123, 124 can, according to the invention, advantageously be in a parabolic shape or any other suitable shape.

In the text, the convex curvatures are described as being of certain sizes, and expressions like "a convex curvature greater than another convex curvature" or "convex curvatures with different lengths" are used. When a convex curvature is greater than another convex curvature (or is described as being longer), that convex curvature has a longer curvature. The best way to exemplify this is to use a circle segment, where a convex curvature being greater than, or longer, than another, means that the radius is greater than another radius. In the case of parabolic convex curvatures, the wording "greater than" or "longer than" corresponds to different distances between a given point on the symmetric axis and different points on the different parabolic convex curvatures on an axis perpendicular to the symmetrical axis in the given point on the symmetric axis.

As mentioned before, the convex curvatures 123, 124 starts where the second internal wall 114 transitions into the edge 125, marked in FIG. 1 with a third line 143, and the convex curvature ends where the edge 125 transitions into the first internal wall 107, marked in FIGS. 1 and 2 with the first line 118, 218. As can be seen in FIG. 1, the third line 143 of each of the pipes has a curvature, which means that the convex curvatures do not start at the same distance from the pipe inlet. The greater convex curvature 123 that faces the air inlet 105 starts further down in the pipe channel, which is depicted in FIG. 1 as the part of the third line 143 farthest away from the pipe inlet 112. However, even if the third line 143 has a curvature in this embodiment, there is a possibility to have a straight third line 143 in a different embodiment, i.e., to have all the convex curvatures starting from the same distance from the pipe inlet.

Another notable feature in this embodiment is that the third line 143 does not coincide with the first cross-section, but is dependent on the length (L1) of the upper part 126 and the feature of the third line, some parts or all of the third line 143 may coincide with the first cross-section 119.

Accordingly, if the edges 125 are described by convex curvatures 123, 124 of different length and with the greater convex curvatures 123 in the direction towards the air inlet 105, then the pipe inlet 112, 212, as seen from above (see FIG. 2), gets a different geometrical shape than the pipe channel 213. According to the invention, this gives rise to a pipe inlet 112 and an upper part 126 of the pipe channel 113 with an edge phased with large convex curvatures 123, 124 towards the air inlet 105 and small convex curvatures 123, 124 away from the air inlet. This difference in the phasing of the edge 125 results in a preserved pulse loading (compared to prior art with small radii edges uniform around the pipe inlet), and also results in an enhanced air supply to the cylinders when the engine is running on high number of revolutions. The air supply is enhanced since the turbulence problem in the upper part of the pipe channel 113 due to the "sharp" edges mentioned in prior art is reduced or even eliminated.

FIGS. 1–7 all refer to different embodiments of the invention where the second area 121 has a circular shape, but, as mentioned above, the second area 121 can have a rectangular cross-section with rounded corners, a D-shape, or an oval shape, or any other shape suitable for the purpose.

Figure 3:
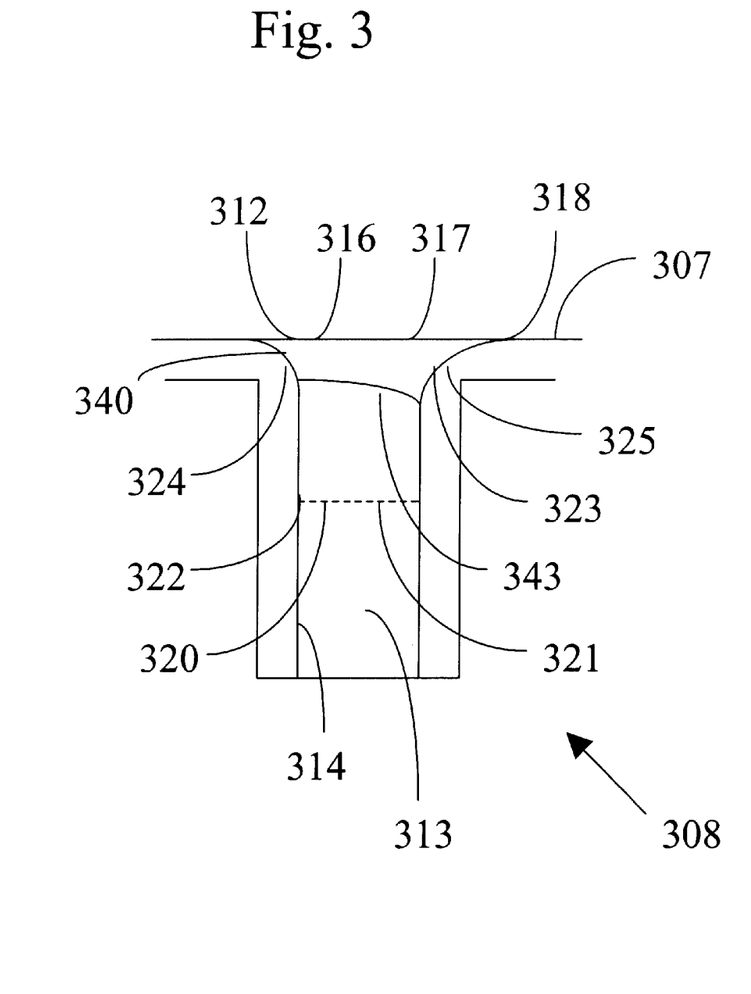
FIG. 3 diagrammatically shows a cross-section of the pipe in FIG. 2, according to the first embodiment.
Figure 4:
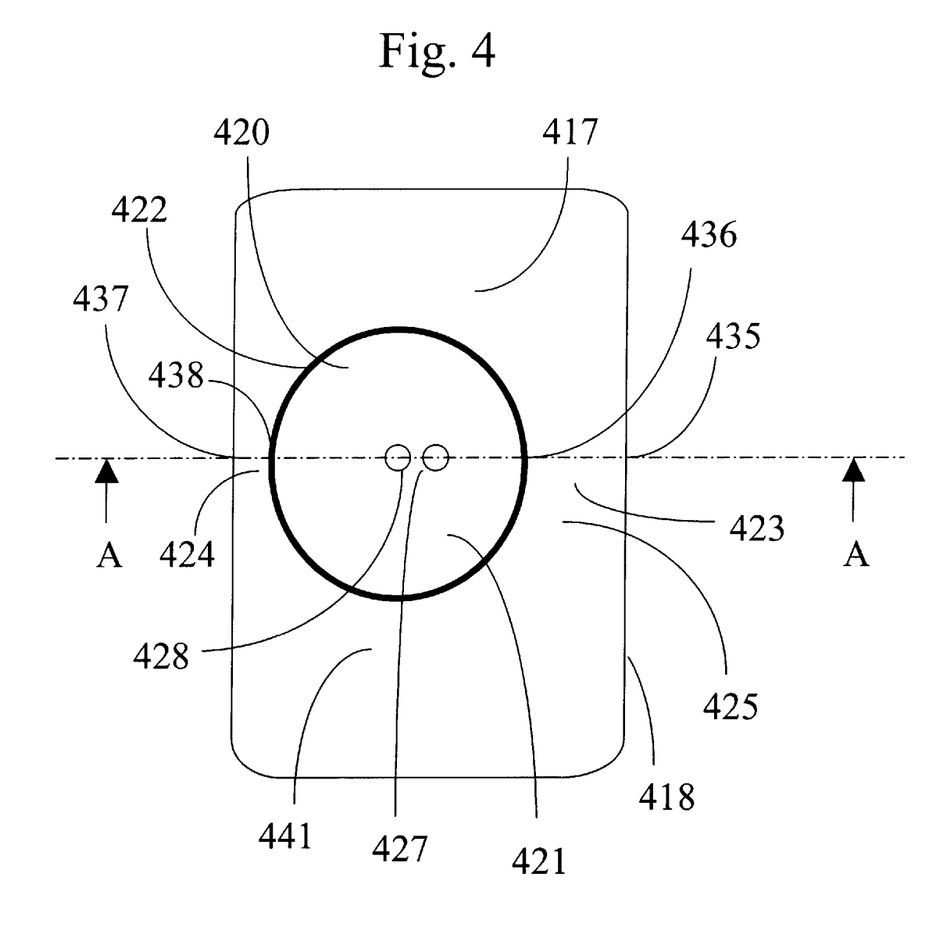
FIG. 4 diagrammatically shows one pipe of the air inlet manifold in FIG. 1 as seen from above, according to another embodiment of the invention.
Figure 5:
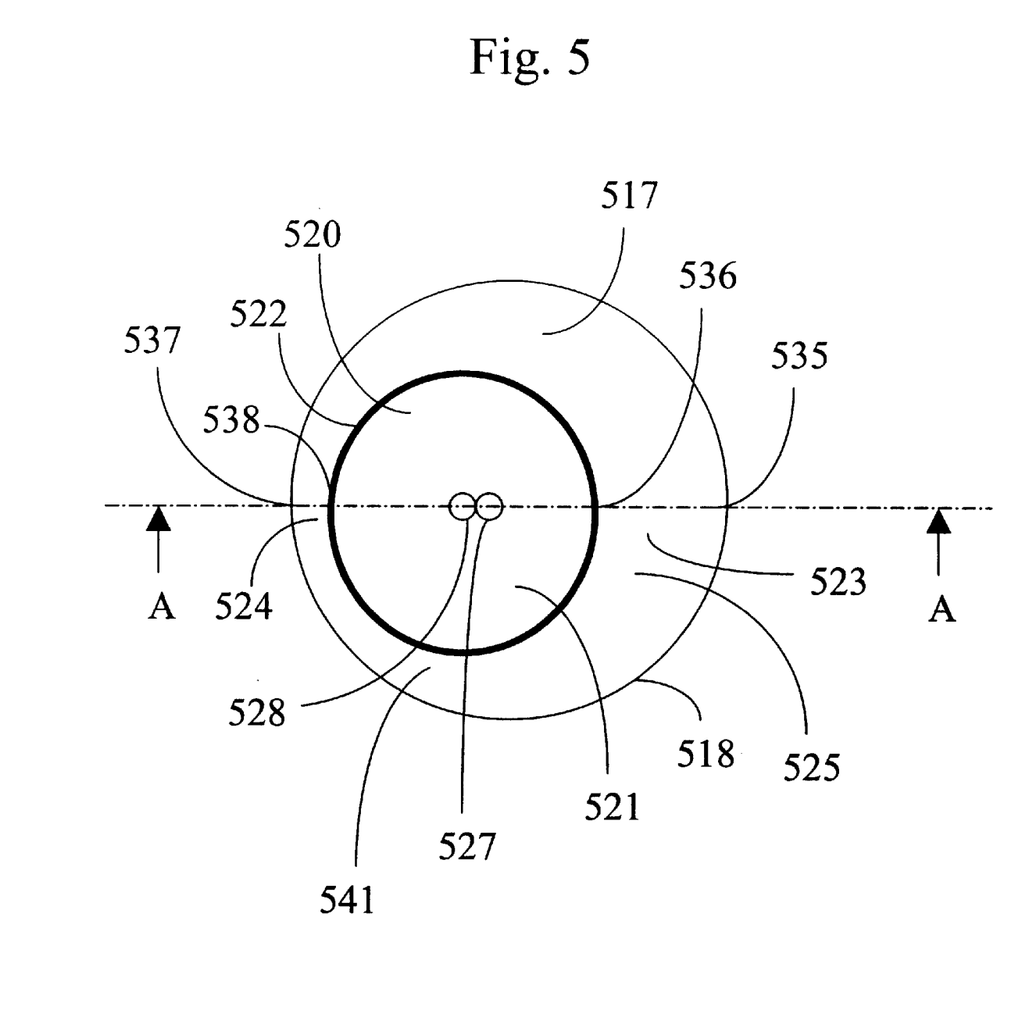
FIG. 5 diagrammatically shows one pipe of the air inlet manifold in FIG. 1 as seen from above, according to yet another embodiment of the invention.
Figure 6:
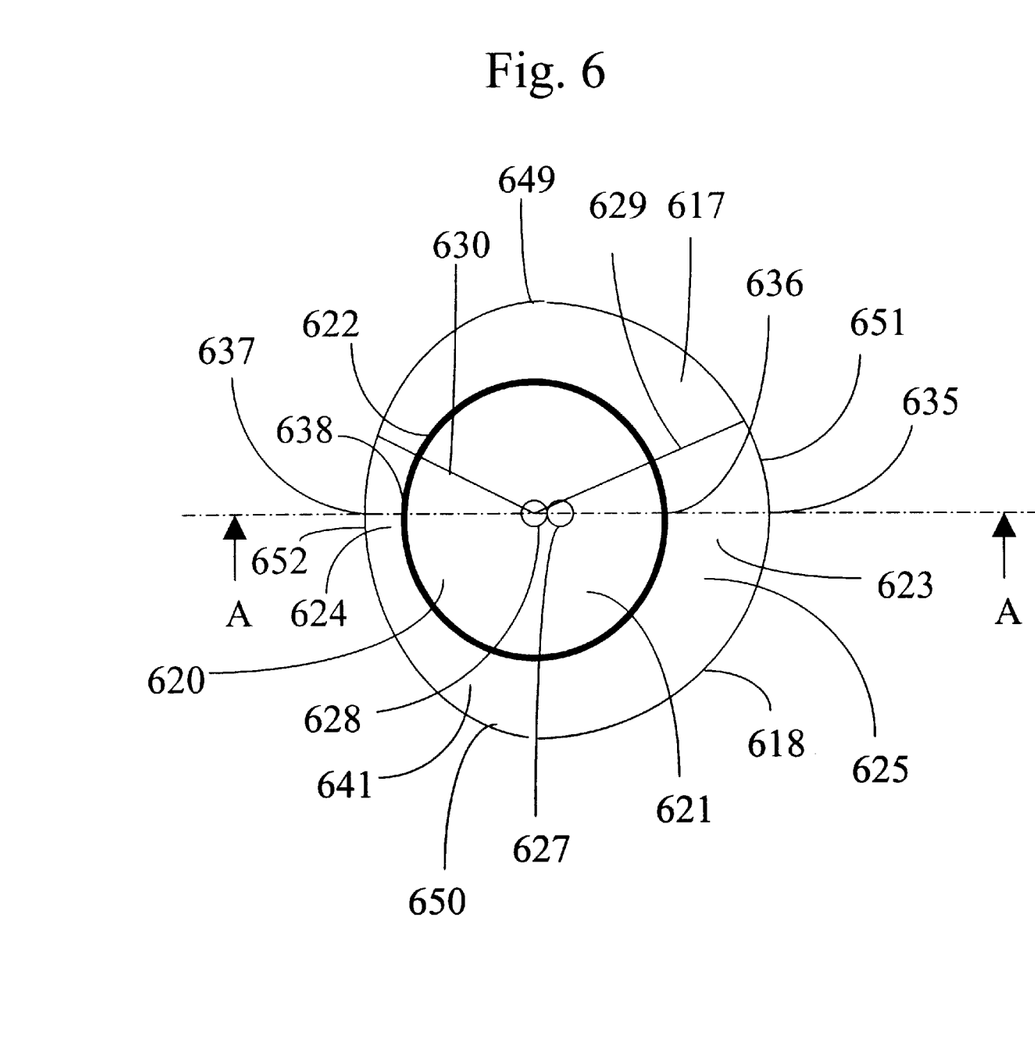
FIG. 6 diagrammatically shows one pipe of the air inlet manifold in FIG. 1 as seen from above, according to yet another embodiment of the invention.

FIGS. 2 and 3 diagrammatically show one pipe 208 and 308, respectively, from two perpendicular directions. Another way to describe the phased edge 225, 325 of the pipe inlet 212, 312, according to the invention, is to look at a cross-section along a longitudinal line A—A in FIG. 2. The line A—A extends in the longitudinal direction through the second point 228, dividing the pipe inlet and the pipe channel into two parts (see FIG. 3). If the second area 221 has a circular shape, which is the case in the shown embodiment, the longitudinal line A—A in FIG. 2, is a symmetrical line A—A that divides the second area in two symmetrical parts. But, if the second area 221 has another shape, the longitudinal line A—A may not divide the second area 221 into two symmetrical parts.

In the two-dimensional cross-sectional view of FIG. 3, the phased edge 325 of the pipe 308 will be described by a first convex curvature 323 and a second convex curvature 324. The first convex curvature 323 faces towards the air inlet 105 and the second convex curvature 324 faces away from the air inlet 105. According to the invention, the first convex curvature 323 is greater than the second convex curvature 324. The third line 343 is depicted in FIG. 3, and implies the same features as mentioned above.

To describe this further, FIG. 2 is used, where one pipe 208 is projected into a two-dimensional view from above, i.e., from the pipe inlet 212 into the pipe channel 213.

For the first convex curvature 223, a first point 235 marks the inter-section between the first line 218 and the longitudinal line A—A on the air inlet 105 side, and a second point 236 marks the inter-section between the second line 222 and the longitudinal line A—A on the air inlet 205 side. Correspondingly, for the second convex curvature 224, a third point 237 marks the inter-section between the first line 218 and the longitudinal line A—A on the end wall 104 side, and a fourth point 238 marks the inter-section between the second line 122 and the longitudinal line A—A on the end wall 104 side. The distance between the first point 235 and the second point 236, L2, and the distance between the third point 237 and the fourth point 238, L3, can thus be used to describe the difference between the first convex curvature 223 and the second convex curvature 224.

As can be seen in FIG. 2, the first area 217 is described with a number of convex curvatures of different sizes, which means that the convex curvatures describing the phased surface 241 of the phased edge 225 have different lengths in different directions around the third area 242. However, one important feature of the invention is that the first convex curvature 223 is greater than the second convex curvature 224, i.e., L2 is greater than L3.

By using the above-described different convex curvatures, the air inlet manifold achieves the benefits of having a high pulse load combined with a high airflow through the pipes.

In FIGS. 2 and 3, the second area 221, 321 has a circular shape and the first area has an elliptical shape with the two end points 144, 145 in a direction perpendicular to the longitudinal direction and with the first center point 227 displaced along the longitudinal direction towards the air inlet 105, compared to the second center point 228.

In another embodiment (FIG. 4) of the invention, the first area 417 has a rectangular shape with rounded corners, and with the first center point 427 displaced along the longitudinal direction towards the air inlet, compared to the second center point 428. In this embodiment, the convex curvatures in the direction perpendicular to the longitudinal direction may be longer than the convex curvatures facing the air inlet, but the convex curvatures 423 facing the air inlet 105 is longer than the convex curvatures 424 facing away from the air inlet 105.

In yet another embodiment (FIG. 5) of the invention, the first area 517 has a circular shape with the first center point 527 displaced along the longitudinal direction towards the air inlet 105, compared to the second center point 528.

In a further embodiment (FIG. 6) of the invention, the first area 617 has a shape described by a first circular line 651, a second circular line 652 and a first and a second connecting curvature 649, 650 adapted to connect the first circular line 651 with the second circular line 652. The first circular line is described by a first variable radius, $r_1$, 629, greater than or equal to a second variable radius, $r_2$, 630, describing the second circular line. The first and a second connecting curvature do not cross the second line 622 in any point. The first and second radii have their starting point in the second center point 628, and which first variable radius describes the first circular line depending on a first angle, $\Phi_1$, and which second radius describes the second circular line dependent on a second angle, $\Phi_2$. The first and second angles relate to an imaginary center line A—A running through the second center point 628 in the longitudinal direction. The first angle is in the range between $0 \leq \Phi_1 \leq 20°$ and $340° \leq \Phi_1 \leq 360°$, and the second angle is in the range between $160° \leq \Phi_2 \leq 200°$. The first area 617 is oriented in such way that when the first angle is 0°, the first variable radius 629 points towards the air inlet. In this embodiment, the first line 618 is combined between the two circular lines 651, 652 and the two connecting curvatures 649, 650, i.e., their respective endpoints meet.

In a further embodiment (FIG. 7) of the invention, a part of or all of the upper part 126 of the pipe channels 713 may also be funnel-shaped, i.e., the upper part of the pipe channels 713 can be described as a cone-shape 746 that transitions into the convex curvatures 723, 724 of the edge 725.

Figure 7:
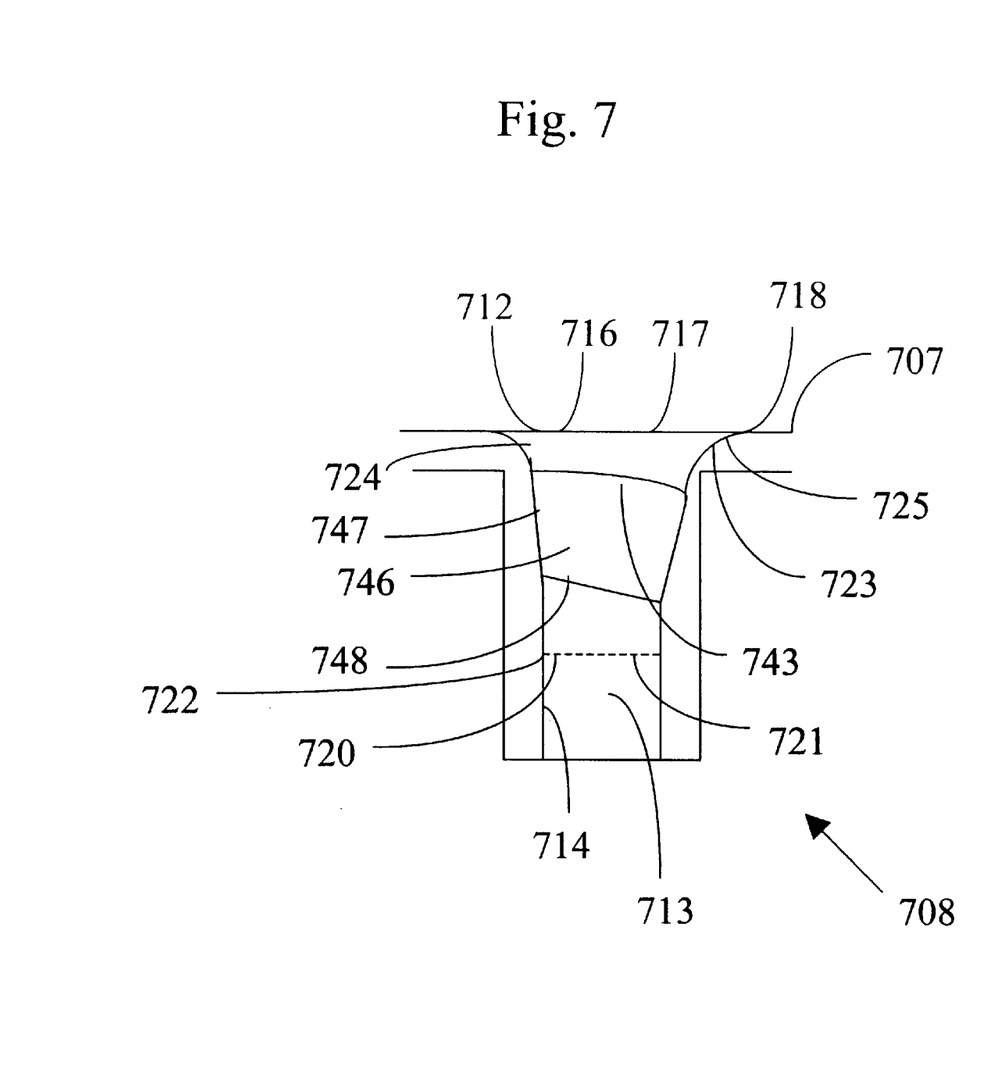
FIG. 7 diagrammatically shows a cross-section of a pipe in FIG. 1, according to a further embodiment of the invention.

As mentioned before, the convex curvatures 723, 724 start where the second internal wall 714 transitions into the edge 725, marked in FIG. 7 with the third line 743, and the convex curvature ends where the edge 725 transitions into the first internal wall 707, marked in FIGS. 1 and 7, with the first line 118 and 718, respectively. As can be seen in FIG. 7, the third line 743 of each of the pipes has a curvature, which means that the convex curvatures 723, 724 do not start on the same distance from the pipe inlet 712. The greater convex curvature 723 that faces the air inlet 105 starts further down in the pipe channel 713, which is depicted in FIG. 7 as the part of the third line 743 farthest away from the pipe inlet 712. The cone shape 746 is also depicted in FIG. 7 as being somewhat skew. The pipe channel 113 becomes cone-shaped 746 by expanding the pipe channel linearly 747 with the extension direction of the pipe channel, in a direction from the first cross-section 719 to the pipe inlet 712. The transition between the pipe channel 713 and the cone-shaped part 746 is depicted in FIG. 7 with a fourth line 148. As can be seen in FIG. 7, the fourth line 148 of each of the pipes has a curvature (or is a straight diagonal line), which means that the cone-shaped part 746 does not start on the same distance from the pipe inlet 712. However, even if the third and the fourth line 743, 748 has a curvature in this embodiment, there is a possibility to have a straight third and fourth line 743, 748 in a different embodiment, i.e., to have all the convex curvatures 723, 724 starting from a first same distance from the pipe inlet 112 and also to have the cone-shaped part starting from a second same distance from the pipe inlet.

Another notable feature in this embodiment is that neither the third line 743 nor the fourth line 748 coincide with the first cross-section 719, but dependent on the length L1 of the upper part 126 and the feature of the fourth line, some parts or all of the fourth line 748 may coincide with the first cross-section 719.

In yet a further embodiment (see FIG. 1) of the invention, the end wall 104 is placed at a predetermined first distance, L4, from the closest pipe, fourth pipe 111, which predetermined first distance is greater than 0.2 times the pipe channel diameter and less than the pipe channel diameter, preferably half the pipe channel diameter.

In order to understand the invention further, an example of an inlet manifold will be described with some numbers. When a six-cylinder engine is running with 3600 rpm, each of the pipes are 4200 mm long and have a diameter of 40 mm to gain the proper air charge loading. To have the small volume necessary for good engine response, the distance between the first internal wall and the opposing wall (or in the case of a cylindrical cross-section of the air inlet manifold, the diameter) is typically at least 1.3 times the pipe diameter and maximum 2 times the pipe diameter, preferably 1.5 times the pipe diameter. The width of the air inlet manifold is typically at least 1.5 times the pipe diameter and maximum 3 times the pipe diameter, preferably 2 times the pipe diameter. And as mentioned before, the length of the air inlet manifold shall be as short as possible. If the pipe channel has a non-circular cross-section, said diameter may, for example, equal the hydraulic diameter $d_h = 4A/U$, where A=cross-section area of the channel and U=the "wetted" perimeter of the channel. The numbers mentioned in this example shall not be seen as limiting for the invention, but merely an example of how an air inlet manifold can be designed. When the engine is running at another rpm, there will be other features employed to provide good air charging. And, if the number of cylinders is other than six, other features are applied.

The invention is not limited to the illustrative embodiment described and explained above, instead many variants are possible within the scope of the attached claims. For instance, the cross-section of the pipes channels need not be circular, but may be in any shape suitable for the purpose, e.g., oval, D-shaped, rectangular with rounded corners, or egg-shaped.

The pipe inlets and the edges of the different pipes may also be shaped differently depending on the placing of the pipe, e.g., the edge of the pipe closest to the air inlet may have one shape and the edge of the pipe farthest away from the air inlet may have a different shape.

The distribution chamber may also vary in shape dependent, for instance, on the distance from the air inlet. For example, the distance between first surface and the opposing wall may be different at a point in the vicinity of the air inlet than at a point a distance away from the air inlet.

The air inlet manifold need not be straight as depicted in the above-mentioned embodiments, but may be bent in different shapes. One common shape is to bend the air inlet manifold between the first and second pipe in such way that the first pipe is pointed inwardly, but still with an upper part essentially perpendicular to the first internal wall.

It has previously been mentioned that the upper part is essentially perpendicular to the first internal wall, but the different phasing of the edges around the pipe inlets according to the present invention may also be used in the case where the upper part is not perpendicular to the first internal wall.

While several modes for carrying out the invention have been described in detail, those familiar with the art to which this invention relates will recognize alternative designs and embodiments for practicing the invention. The above-described embodiments are intended to illustrative of the invention, which may be modified within the scope of the following claims.

I claim:

1. An air inlet manifold for a multi-cylinder internal combustion engine, which air inlet manifold has a first end, an opposing second end, an air inlet at the first end, and a distribution chamber for air restricted by at least a first internal wall, comprising:

a plurality of pipes for delivery of air to the cylinders, which pipes are distributed between the first end and the second end, each pipe comprises a pipe inlet, a pipe channel, which pipe channel is restricted by at least a second internal wall, which pipe inlet is described by a first surface with a first area restricted by a first line in the boundary between the pipe inlet and the first internal wall, which pipe channel in a first cross-section is described by a second surface with a second area restricted by a second line along the perimeter of the pipe channel, which first cross-section is generally perpendicular to the extension direction of the pipe channel wherein a first profile between the first line and the second line of said pipe located proximate to the air inlet has a different curvature than a second profile between the first line and the second line of said pipe located distant from the air inlet.

2. The air inlet manifold of claim 1 wherein said different curvature comprises a greater curvature.

3. An air inlet manifold of claim 1 wherein said first and second profiles between the first line and the second line with the curvatures between the first line and the second line describing an edge and the edges of each of the pipe inlets are phased with a surface described by convex curvatures, which convex curvatures extend from the second internal wall to the first internal wall.

4. An air inlet manifold according to claim 2 wherein a part of the pipe channels are funnel-shaped.

5. An air inlet manifold according to claim 2 wherein the second area has a circular shape.

6. An air inlet manifold according to claim 3 wherein the first area has an elliptical shape with the center of gravity of the first area displaced towards the air inlet, compared to the center of gravity of the second area.

7. An air inlet manifold according to claim 3 wherein the first area has a rectangular shape with rounded corners with the center of gravity of the first area displaced towards the air inlet compared to the center of gravity of the second area.

8. An air inlet manifold according to claim 3 wherein the first area has a circular shape with the center of gravity of the first area displaced towards the air inlet compared to the center of gravity of the second area.

9. An air inlet manifold according to claim 3 wherein the first area has a shape described by a first circular line, a second circular line, and a first and a second connecting curvature adapted to connect the first circular line to the second circular line, which first circular line is described by a first variable radius, $r_1$, greater than or equal to a second variable radius, $r_2$, describing the second circular line, which first and second radii have their starting point in the second center point, and which first variable radius describes the first circular line depending on a first angle, $\Phi_1$, and which second radius describes the second circular line dependent on a second angle, $\Phi_2$, which first and second angles relate to an imaginary center line running through the second center point in the longitudinal direction, and which first area is oriented in such way that when the first angle is 0°, the first variable radius points towards the air inlet.

10. An air inlet manifold according to claim 1, further comprising an end wall placed at a predetermined first distance from the closest pipe, said predetermined first distance is greater than 0.2 times the pipe channel diameter.

11. An air inlet manifold according to claim 1 wherein the first area is greater than the second area.

12. An air inlet manifold for a multi-cylinder internal combustion engine, the air inlet manifold has a first end, an opposing second end, an air inlet at the first end, a distribution chamber for air restricted by at least a first internal wall, and a plurality of air pipes for delivery of air to the cylinders, said pipes are distributed between the first end and the second end, each pipe comprising a pipe inlet, a pipe channel, which pipe channel is defined by an interior periphery of said pipe, which pipe inlet is defined by a surface extending between said first internal wall and said interior periphery wherein a profile of said surface located proximate to the air inlet has a different curvature than a profile of said surface located distant from the air inlet.

* * * * *